Oct. 7, 1969  D. F. WALKER ET AL  3,470,873
ADJUSTABLE ANIMAL SPLINT

Filed March 17, 1967  3 Sheets-Sheet 1

INVENTORS
DONALD F. WALKER,
DUANE N. RICE,
DAVID H. CROWSON &
REGINALD I. VACHON

BY *Shoemaker and Mattare*

ATTORNEYS

Oct. 7, 1969    D. F. WALKER ET AL    3,470,873
ADJUSTABLE ANIMAL SPLINT
Filed March 17, 1967    3 Sheets-Sheet 2

INVENTORS
DONALD F. WALKER,
DUANE N. RICE,
DAVID H. CROWSON &
REGINALD I. VACHON
BY
Shoemaker and Mattare
ATTORNEYS

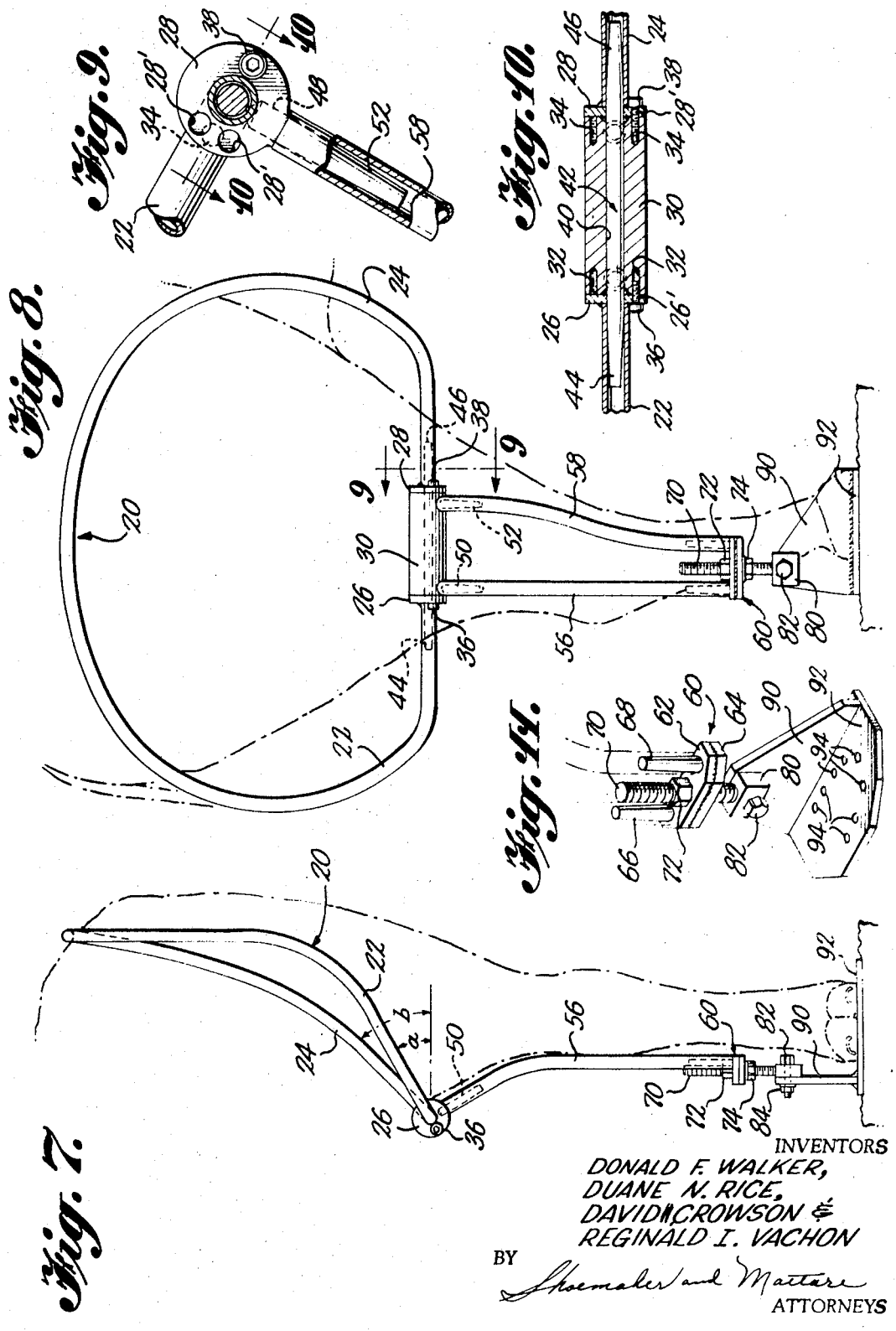

United States Patent Office 3,470,873
Patented Oct. 7, 1969

3,470,873
ADJUSTABLE ANIMAL SPLINT
Donald F. Walker, Auburn, Ala., Duane N. Rice, Broken Bow, Nebr., David H. Crowson, Pascagoula, Miss., and Reginald I. Vachon, Auburn, Ala., assignors to Auburn Research Foundation, Auburn, Ala., a corporation of Alabama
Filed Mar. 17, 1967, Ser. No. 624,021
Int. Cl. A61f 5/04; A61d 9/00
U.S. Cl. 128—85
9 Claims

ABSTRACT OF THE DISCLOSURE

A hip engaging means comprises an arcuate tubular member adapted to fit about the hip of the animal and being externally padded. The opposite ends of this hip engaging means are operatively connected with a connecting means and are angularly adjustable relative thereto for adjusting the angle of the hip engaging means. The connecting means has a pair of projecting rods extending therefrom which are received within the opens of each of two tubular leg support members. These leg support members are curved to conform to the shape of the associated animal's leg. The lower ends of the leg support members receive two projecting rods extending upwardly from an extension body means. These leg support members may be interchanged for adjusting the length of the splint. The extension body means is provided with a central threaded hole within which is threaded an extension rod having lock nuts mounted thereon. The lower end of the extension rod is connected with a foot plate support means which is pivotally interconnected with a foot plate to which the hoof of the animal is attached.

Background of the invention

The present invention relates to an adjustable animal splint particularly for use with bovines and the like. The splint is used to repair fractures as well as other maladies of the joints, ligaments and muscles, which require rest and fixation for correction, the splint at the same time allowing mobility of the animal.

This type of splint is employed for causing extension of the leg of an animal and for allowing for a reduction of a fracture. It is designed to maintain the bone fragments in a fixed position during the healing process and to remove the weight of the animal from the fractured ends of the bone to a point higher on the animal's anatomy, thereby allowing healing to take place.

In the prior art, splints designed for this purpose involve arrangements wherein the extremity of the animal is bound to a rigid support thereby fixing the extremity and immobilizing the animal. This in itself is an undesirable feature since it is advantageous to allow the animal to maintain mobility during the healing process.

The rigid supports as employed in the prior art did not afford extensibility of the structure so as to adjust and maintain traction on the animal's limb. In addition, such rigid structures did not provide variability of the angle of the hip engaging means with respect to the remainder of the structure so that the devices were not sufficiently versatile to be accurately fitted to different size animals.

The rigid supports of the prior art structure did not provide flexibility of the splint in the area of the fetlock of the leg of a bovine or the like which would permit the bovine to remain ambulatory during the healing process.

Furthermore, the rigid supports of the prior art have not provided leg support portions which substantially conform to the configuration of the limb of the animal thereby at times interfering with the normal functions of the animal.

Summary of the invention

In the arrangement of the present invention, the disadvantages encountered in the prior art have been overcome. With the present arrangement, it is not necessary to immobilize the animal since the splint is provided with flexibility in the area of the fetlock of the animal by providing a pivotal interconnection between the foot plate structure attached to the hoof of the animal and the remaining portions of the splint so that the animal can flex the fetlock and remain fully ambulatory during the healing process.

The leg support members of the present invention are shaped to conform to the contour of the leg of the animal thereby providing maximum comfort and minimum of interference with the normal activities of the animal.

The leg support members of the present invention are additionally readily replaceable so as to enable the length thereof to be adjusted in accordance with the size of the associated animal. Furthermore, extension means is provided for extending the foot plate support with respect to the lower ends of the leg support members whereby the tension of the splint may be readily adjusted.

A further feature of the present invention is the provision of an angularly adjustable connection between the upper ends of the leg support members and the hip engaging means. This enables the hip engaging means to be angularly adjusted with respect to the remaining portions of the splint so as to properly fit on different animals.

An object of the present invention is to provide a new and novel adjustable animal splint which provides flexibility of the splint in the area of the fetlock of an animal and which is adapted to conform to the contour of the animal's leg.

Another object of the invention is the provision of an animal splint including means for readily adjusting the length thereof and further enabling the tension of the splint to be easily adjusted.

Still another object of the invention is to provide an animal splint wherein the angle of the hip engaging means may be adjusted with respect to the remaining portions of the splint.

Brief description of the drawings

FIG. 7 is a rear view of the complete splint assembly prior to placing the padding thereon;

FIG. 8 is a side view of the structure shown in FIG. 7;

FIG. 9 is a sectional view on an enlarged scale taken substantially along line 9—9 of FIG. 8 looking in the direction of the arrows;

FIG. 10 is a sectional view taken substantially along line 10—10 of FIG. 9 looking in the direction of the arrows; and FIG. 11 is a top perspective view on an enlarged scale illustrating the manner of supporting the foot plate of the splint from the extension body means thereof.

Description of the preferred embodiment

Figure 1:
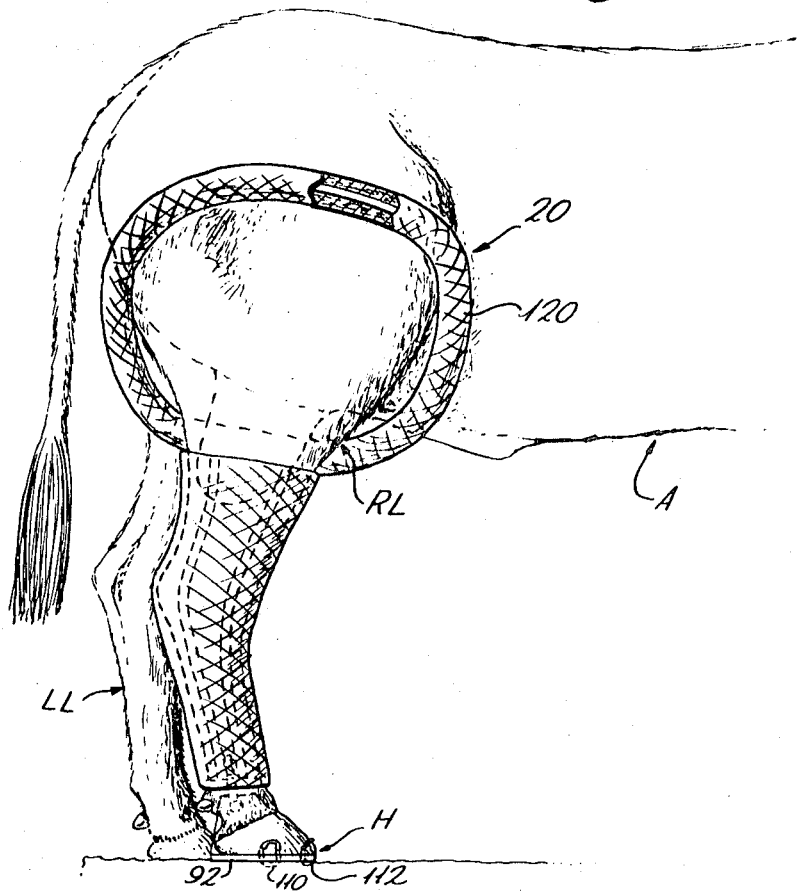
FIG. 1 is a side view illustrating the completed splint of the present invention mounted upon the leg of an animal.

Referring now to the drawing wherein like reference characters designate corresponding parts throughout the several views, the basic splint mechanism is illustrated most clearly in FIGS. 7–11 inclusive. A hip engaging means is indicated generally by reference numeral 20 and comprises an elongated tubular member preferably formed of aluminum or similar lightweight material as are the remaining components of the apparatus. The hip engaging means is of generally arcuate configuration as seen in FIG. 8 so as to fit around the hip portion of the animal, and as seen in FIG. 7, a rear portion 22 extends at an angle $a$ of approximately 30 degrees with respect to the horizontal which in turn joins with a forward portion 24 which extends at an angle $b$ of approximately 45 degrees with respect to the horizontal as seen in this figure. This particular configuration enables the hip engaging means to fit properly about the hip portion of the associated animal.

The free ends of rear portion 22 and forward portion 24 of the hip engaging means are fixedly connected as by welding or the like to plates 26 and 28 of similar construction. Plate 26 is provided with three spaced holes 26', and plate 28 is provided with three spaced holes 28'. The holes are similarly spaced in the two plates, and as seen in FIG. 9, a pair of holes 28' are provided at the upper left-hand portion of the plate as seen in this figure, while a hole is also provided in the lower right-hand portion of this figure, this third hole not being visible in FIG. 9.

A connecting means includes a generally cylindrical block 30 having a pair of generally diametrically opposite holes 32 formed at the left-hand end thereof and opening through the end thereof, a similar pair of diametrically opposite holes 34 being provided at the other end of the block and opening through the right-hand end thereof as seen in FIG. 10. Holes 32 and 34 are threaded, and holes 32 receive the threaded end of a steel Allen head cap screw 36 which is inserted through one of the holes 26' in plate 26, while hole 34 receives a similar cap screw 38 inserted through one of the holes 28' provided in plate 28.

A central bore 40 is formed through block 30, and an elongated rod 42 is fixedly supported within this bore, the rod including opposite tapered end portions 44 and 46 which form projections extending from opposite ends of the connecting means. Tapered end portion 44 is received within the open end of portion 22 of the hip engaging means and an aligned hole formed through plate 26. The tapered end portion 46 is received within the open end of tubular portion 24 of the hip engaging means and an aligned hole formed through plate 28.

It is apparent that the cap screws 36 and 38 may be removed from the holes within which they are disposed and referring to FIG. 9, either of the other two holes 28' provided in plate 28 may be aligned with the hole 34 in the upper left-hand portion of this figure and the cap screws threaded into place for holding the hip engaging means in a different angularly adjusted position. It is apparent that the hip engaging means may be moved into three different angular relationships with respect to the connecting means with the arrangement as shown, and additional holes may be provided if required.

Block 30 is provided with a pair of generally radially extending holes 48 one of which is seen in FIG. 9, these holes receiving tapered rods or projecting means 50 and 52 as seen in FIG. 8, these projecting means being suitably retained in place as by welding or the like to the outer surface of block 30.

As seen most clearly in FIG. 8, a pair of leg support members 56 and 58 are provided, these members being of tubular construction, with the opposite end portions thereof being open. As noted in FIGS. 7 and 8, the upper open ends of these leg support members are adapted to snugly receive the projecting means 50 and 52 for operatively connecting the leg support members with the connecting means. As noted in FIG. 8, leg support member 58 is arcuate or curved in one plane, and as seen in FIG. 7, each of the leg support members is also curved or of arcuate configuration throughout a portion thereof in another plane so as to substantially conform to the shape of the leg of the associated animal as indicated in phantom lines.

As seen most clearly in FIG. 11, an extension body means is indicated generally by reference numeral 60 and includes a pair of plates 62 and 64 suitably rigidly secured to one another as by welding or the like. Plate 62 is provided with a pair of holes receiving the lower ends of two tapered rods or projecting means 66 and 68. These projecting means 66 and 68 are received respectively within the lower open ends of the leg support members 56 and 58 to provide an operative connection therewith.

The plates 62 and 64 are provided with a central hole which loosely receives threaded extension rod 70. Rod 70 has a pair of lock nuts 72 and 74 threaded thereon above and below the extension body means 60 for adjusting and locking the extension rod in a particular position.

A foot plate support means 80 is provided in the form of a block of material secured to the lower end of extension rod 70, block 80 having a hole formed therethrough which receives a steel cap screw 82 which has a nut 84 threaded on the outer end thereof. This cap screw extends through a hole provided in an upwardly extending member 90 of the foot plate means whereby the foot plate means is adapted to be pivotally interconnected with the foot plate support means 80 through the intermediary of cap screw 82. This construction also enables member 90 to be locked to member 80 to prevent movement about the axis of member 82 when the components have been assembled in the proper relationship. Accordingly, the pivot can be locked at the fetlock to prevent movement in the event the fracture is in this area.

A bottom member 92 of the foot plate means is rigidly secured to member 90 as by welding or the like, and extends at substantially right angles to member 90. As seen most clearly in FIG. 11, member 92 is provided with a plurality of holes 94 shown as being eight in number for receiving wires attached to the hoof of an animal whereby the foot plate means is adapted to be rigidly affixed to the hoof of the animal.

The pivot axis of member 82 may be aligned with the individual animal's pivot axis by using wedge or spacer plates between the hoof of the animal and bottom member 92 of the foot plate means. The hole formed in member 90 is selected for the largest animal for which the device is to be employed. The apparatus may be used with animals having shorter bone structure by employing wedge or spacer plates as mentioned above, while the apparatus will still fit the largest animal.

Figure 2:
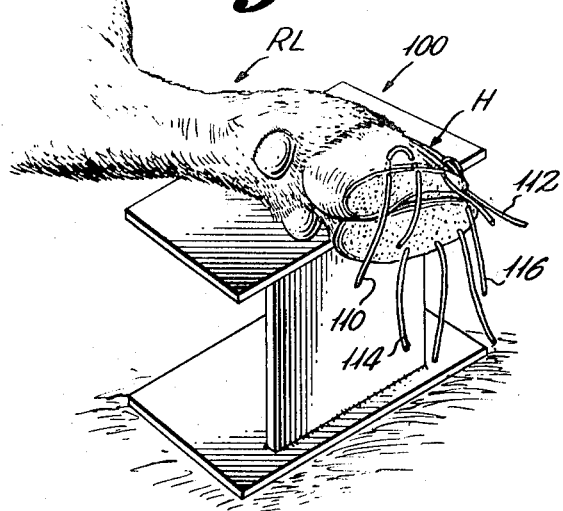
FIG. 2 is a top perspective view illustrating the manner in which wires are attached to the hoof of an animal for securing the foot plate thereto.

The first step in preparation for applying the splint of the present invention is illustrated in FIG. 2. As seen in FIG. 1, an animal is indicated by reference character A, the animal in this case being a large bull including a right leg RL, a left leg LL, and the hoof of the right leg being indicated by H. As seen in FIG. 2, the hoof is supported on a suitable support means 100, and steel wires 110, 112, 114 and 116 are threaded through suitable holes drilled in the hoof as illustrated.

Figure 3:
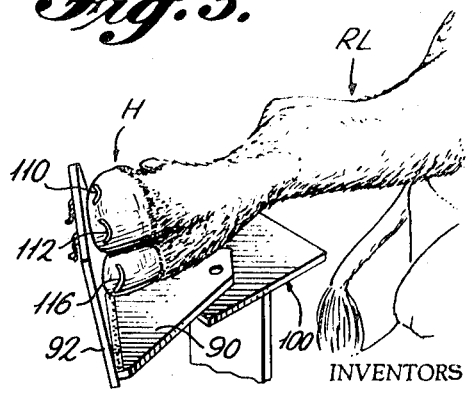
FIG. 3 is a top perspective view illustrating a foot plate mounted on the hoof of an animal.

Referring now to FIG. 3, the next step in assembling the splint of the present invention is to attach the foot plate means to the hoof of the animal by threading the wires through the holes provided in member 92 of the foot plate means and tying the opposite free ends of the wires so as to tightly clamp the foot plate means onto the hoof of the animal.

Figure 4:
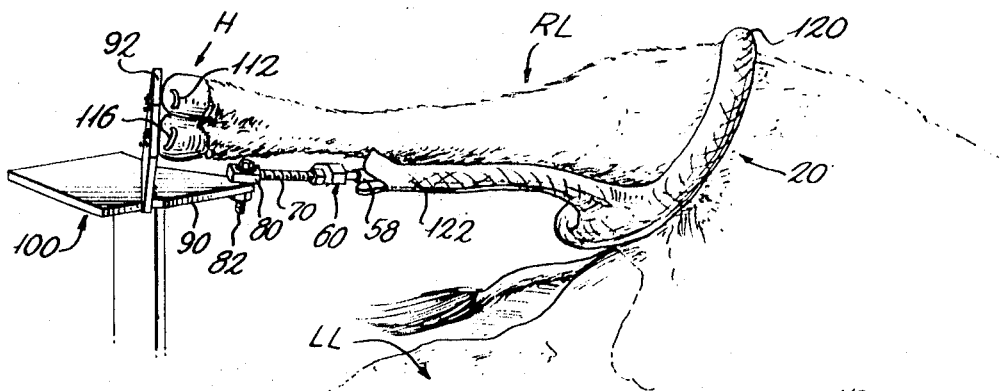
FIG. 4 is a top perspective view illustrating the splint mounted on the leg of an animal.

Referring now to FIG. 4, the splint is illustrated in its assembled position on the leg of the animal. The hip engaging means 20 is initially adjusted to the proper angular relationship with respect to the connecting means and locked in place by the cap screws. Suitable length leg support members are then operatively connected between the projecting means on the connecting member and the projecting means on the extension body means in accordance with the size of the animal. Final tension is obtained by adjusting the adjusting rod 70 as required. Suitable padding 120 is placed around the hip engaging means, and similar padding 122 is placed around the leg support members to prevent skin necrosis. This padding may be of any suitable non-irritating fabric or the like.

Figure 5:
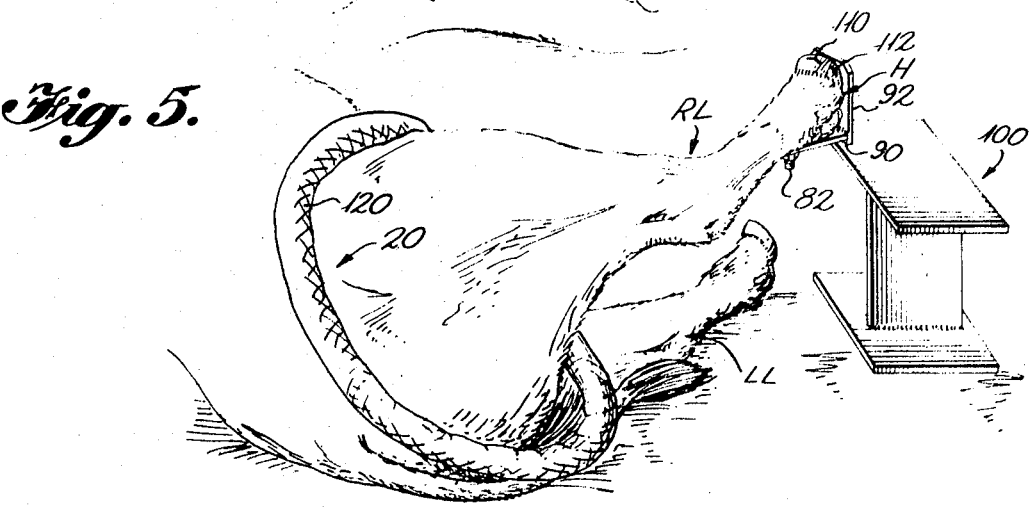
FIG. 5 is a rear perspective view of the arrangement shown in FIG. 4.
Figure 6:
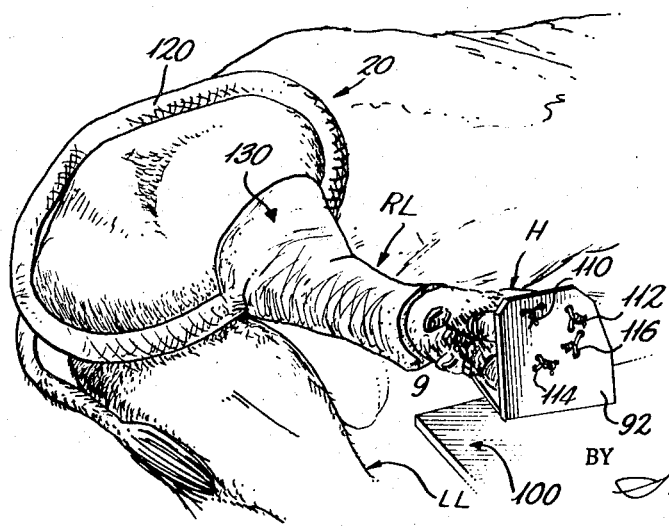
FIG. 6 is a top perspective view illustrating the splint after a plaster cast has been applied thereabout.

After the splint has been assembled on the animal in the operative position shown in FIGS. 4 and 5, a plaster cast indicated by reference numeral 130 and illustrated in FIG. 6 is placed around the splint and portion of the leg as seen in FIG. 6 extending from the hip of the animal downwardly to a point adjacent and above the fetlock of the animal so as to allow the fetlock to pivot in its usual manner when the animal is walking. This plaster cast will serve to maintain the intermediate portions of the splint immobile, and yet at the same time the hoof of the animal is adapted to pivot with respect to the remaining portion of the leg.

It is apparent from the foregoing that there is provided according to the present invention a new and novel flexible animal splint which provides flexibility at the fetlock due to the pivotal support of the foot plate means with respect to the associated foot plate support member through the intermediary of the cap screw 82. The configuration of the leg support means conforms substantially to the contour of the animal's leg. The length of the splint may be adjusted by placing leg support members of various size therein and furthermore the extension rod 70 affords a means of adjusting the length and the tension of the splint to maintain traction on the limb. The interconnection between the hip engaging means and the connecting means enables the angle of the hip engaging means to be adjusted as required with respect to the remainder of the splint.

We claim:

1. An adjustable animal splint comprising a hip engaging and encircling loop substantially defining a plane, connecting means rigidly connected with and joining the ends of said hip engaging loop, leg support means readily detachably connected with said connecting means and forming an adjustable obtuse angle with the plane of said loop, means for selectively adjusting said obtuse angle, foot plate support means readily detachably connected with said leg support means, and a foot plate means pivotally connected with said foot plate support means, said foot plate means including means for attaching the hoof of an animal thereto.

2. A splint as defined in claim 1 wherein said leg support means comprises a pair of elongated members each of which is provided with a predetermined configuration so as to conform substantially to the shape of an associated animal's leg.

3. An adjustable animal splint comprising hip engaging means, connecting means operatively connected with said hip engaging means, leg support means operatively connected with said connecting means, foot plate support means operatively connected with said leg support means, and a foot plate means pivotally connected with said foot plate support means, said foot plate means including means for attaching the hoof of an animal thereto, said connecting means providing an angularly adjustable connection between said hip engaging means and said leg support means whereby the angle of said hip engaging means with respect to leg support means may be selectively adjusted, the structure for providing angular adjustment between said hip engaging means and said leg support means comprising opposite free ends of said hip engaging means having plate means secured thereto, each of said plate means having a plurality of holes formed therethrough, said connecting means having at least one hole formed at opposite ends thereof, and connecting members adapted to extend through one of said holes in each of said plate means and into one of said holes in said connecting means for holding the hip engaging means in a predetermined angular relationship with respect to said connecting means.

4. A splint as defined in claim 3 wherein said connecting means includes projecting means extending therefrom, said leg support means having open end portions for receiving said projecting means for operatively connecting said leg support means with said connecting means at a fixed angular position relative thereto.

5. An adjustable animal splint comprising hip engaging means, connecting means operatively connected with said hip engaging means, leg support means operatively connected with said connecting means, foot plate support means operatively connected with said leg support means, and a foot plate means pivotally connected with said foot plate support means, said foot plate means including means for attaching the hoof of an animal thereto, an extension body means operatively connected with the lower end of said leg support means, said extension body means having a hole formed therethrough, a threaded extension rod extending loosely through said hole, the lower end of said extension rod being operatively connected with said foot plate support means, lock nut means threaded on said extension rod whereby the position of said foot plate support means with respect to the lower end of said leg support means may be selectively adjusted and locked for varying the tension of the splint.

6. An adjustable animal splint comprising hip engaging means, connecting means operatively connected with said hip engaging means, leg support means operatively connected with said connecting means, foot plate support means operatively connected with said leg support means, and a foot plate means pivotally connected with said foot plate support means, said foot plate means including means for attaching the hoof of an animal thereto, said connecting means being mounted for angular adjustment with respect to said hip engaging means, means for securing said connecting means in a particular angular relationship to said hip engaging means, projecting means extending from said connecting means, said leg support means comprising a pair of members, the upper ends of each of said last-mentioned members being open for receiving said projecting means on the connecting means, extension body means having projecting means extending therefrom, the lower ends of each of said leg support members being open for receiving said last-mentioned projecting means for operatively connecting the leg support members with said extension body means, said extension body means having a hole formed therethrough, a threaded extension rod extending loosely through said hole, the lower end of said extension rod being operatively connected with said foot plate support means, lock nut means threaded on said extension rod whereby the position of said foot plate support means with respect to the lower end of said leg support means may be selectively adjusted and locked for varying the tension of the splint.

7. A splint as defined in claim 6 wherein said hip engaging means comprises an arcuate tubular member including first and second portions extending at different angles relative to said connecting means, the free ends of said first and second portions having plates secured thereto, each of said plates having a plurality of holes formed therein, the opposite ends of said connecting means each having at least one hole formed therein, connecting members extending through the holes in said plate means and into the holes in said connecting means for retaining the connecting means in predetermined angular relationship with respect to said hip engaging means.

8. A splint as defined in claim 7 including projecting means extending from opposite ends of said connecting means and being received within the open free ends of said first and second portions of the hip engaging means, said first-mentioned projecting means extending at substantially right angles to the direction in which said last-mentioned projecting means extend.

9. A splint as defined in claim 6 wherein each of said leg support members includes an arcuate portion of such a configuration as to substantially conform to the shape of an associated animal's leg.

References Cited

UNITED STATES PATENTS

| | | | |
|---|---|---|---|
| 649,237 | 5/1900 | Dyson | 128—88 |
| 874,446 | 12/1907 | Slater | 128—87 |
| 1,228,113 | 5/1917 | Hinson | 128—88 |
| 1,336,695 | 4/1920 | Gromes | 128—88 |
| 1,442,711 | 1/1923 | Delorme | 128—85 |
| 1,573,296 | 2/1926 | Brasell | 128—85 |
| 2,016,958 | 10/1935 | Clarke | 128—87 XR |
| 2,934,064 | 4/1960 | Invidiato. | |

FOREIGN PATENTS 232,382    4/1925    Great Britain.

RICHARD A. GAUDET, Primary Examiner

RONALD L. FRINKS, Assistant Examiner

U.S. Cl. X.R.

128—88, 89